March 15, 1960

W. J. MORRILL 2,928,632

RESILIENT MOTOR MOUNTING

Filed Aug. 9, 1954

INVENTOR.
Wayne J. Morrill
BY Woodling and Krost
his attys

Witness:
Clyde H. Haynes

March 15, 1960     W. J. MORRILL     2,928,632
RESILIENT MOTOR MOUNTING
Filed Aug. 9, 1954     2 Sheets-Sheet 2
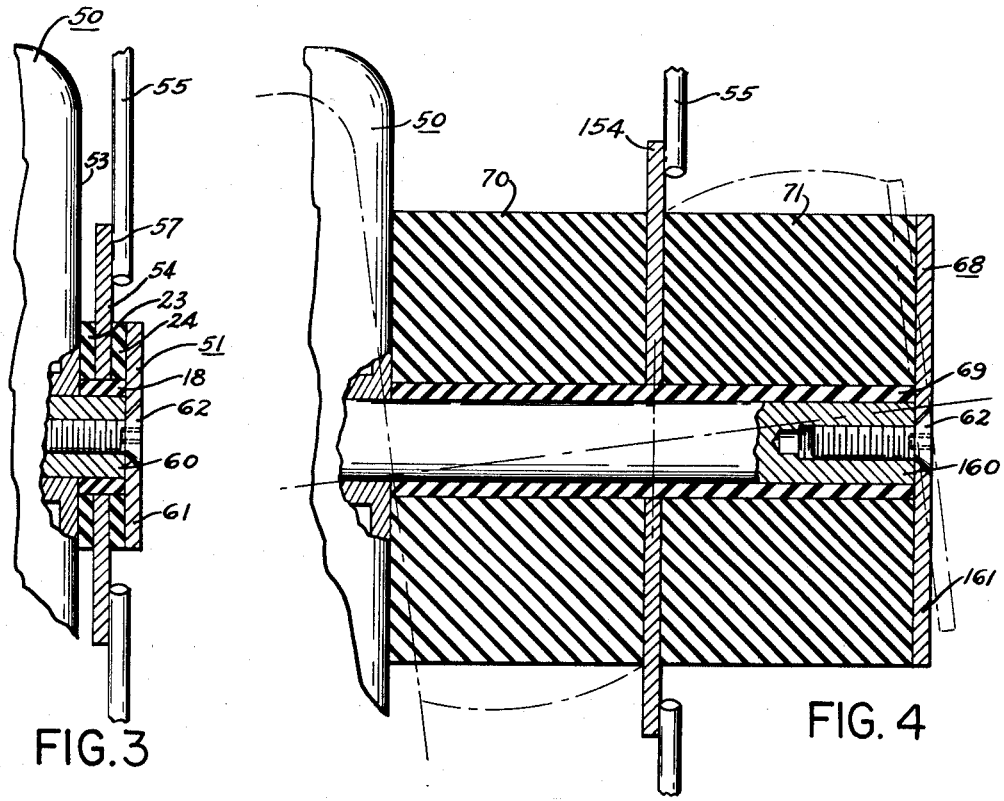
FIG. 3
FIG. 4
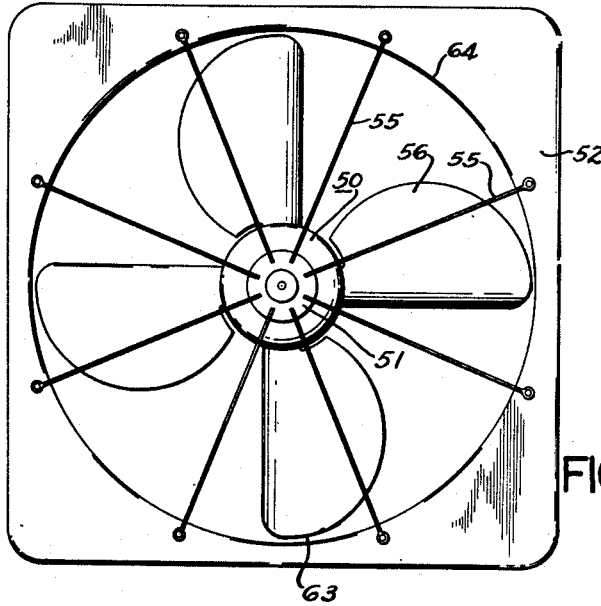
FIG. 5
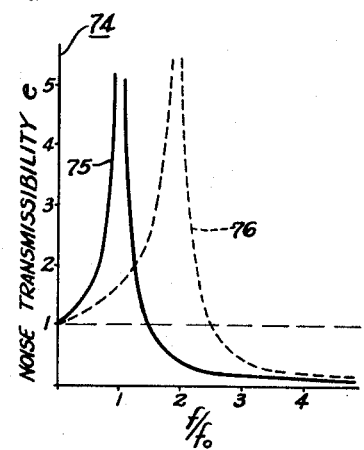
FIG. 6
INVENTOR.
Wayne J. Morrill
BY Woodling and Krost,
atty.

United States Patent Office 2,928,632
Patented Mar. 15, 1960

2,928,632

RESILIENT MOTOR MOUNTING

Wayne J. Morrill, Garrett, Ind.

Application August 9, 1954, Serial No. 448,523

2 Claims. (Cl. 248—26)

My invention relates in general to motor mountings, and in particular to an improved motor mounting to be attached to one end of an electric motor for supporting the motor.

The present application is a continuation-in-part of my original application on Motor Mounting Bearing Serial No. 59,261 and filed in the Patent Office on November 10, 1948, now abandoned.

Many times it is desired to mount an electric motor, for example a small electric fan motor, in such manner that the motor has a slight amount of rotational freedom, but does not have any translational movement. It has generally been considered that a motor would droop if it were mounted on one end only and with resilient mountings which would permit this slight rotational movement. A realization of the difficulty of producing sufficient mechanical rigidity to droop and to mechanical unbalance vibrations has probably kept others from using a single end elastic support. After many attempts I found that the proper characteristics could be obtained whereby an electric motor can be effectively supported on one end only. An important part of my invention has to do with the discovery that a motor may be supported in a horizontal position from one end by means of flat elastic washers and given sufficient rotary freedom about the shaft axis for good rotary vibration isolation without having excessive droop or excessive freedom to vibrate about an axis perpendicular to the shaft. Resilient mountings for motors are very desirable also to prevent the traveling of vibration caused by the motor into the structure which supports the motor. Therefore, one of the objects of my invention is to provide a motor mounting which will permit slight rotational movement of the motor and yet will prevent translational movement.

Another object of my invention is to provide a motor mounting which supports the motor at one end thereof without letting the motor droop.

A further object of my invention is to provide a motor mounting which engages one end of the motor housing to support the motor with the armature extending perpendicularly to the motor support.

Another object of the invention is to provide a single end elastic mounting for a single phase motor so proportioned as to effectively minimize transmission of double frequency vibration to the supporting structure.

Another object of the invention is to provide a single end elastic mounting so constructed as to minimize the droop of the motor due to its overhung weight and that of any attached apparatus.

Another object of the invention is to provide an elastic mounting that will be simple in construction, low in cost, and easily applied.

Another object of the invention is to provide an elastic mounting that will use a minimum of rubber or rubber-like material and thus be compacted as well as low in cost.

Another object of the invention is to provide an elastic mounting that will add little to the overall length of the motor.

Another object of the invention is to provide an elastic mounting that is especially adapted to fan motors where it is desired to have a minimum axial dimension.

Another object of the invention is to provide a single and elastic mounting that provides adequate support against shipment shocks when the motor and assembled apparatus are transported.

Another object of the invention is to provide a single and elastic mounting that provides adequate stiffness against vibration of unbalanced apparatus.

Another object of the invention is to provide a single end elastic mounting which may be easily disassembled to allow replacement of either the motor or the rubber.

Another object of the invention is to provide a single end elastic mounting which permits use of a stationary motor shaft to serve both as a shaft and as a motor support.

Another object of the invention is to provide a single end elastic mounting which is coaxial with an axis through the center of gravity of the stator of the motor.

A still further object of my invention is to provide a resilient motor mounting which is economical to manufacture, and which has a sturdy construction.

Still another object of my invention is to provide a motor mounting, in which the motor is supported on one end only with the armature shaft in a horizontal plane, with good vibration isolation whereby the natural frequency of the mass in vibration on the elastic support is considerably less than the frequency to be isolated.

Other objects and a fuller understanding of the invention may be had by referring to the following description and claims, taken in conjunction with the accompanying drawings, in which:

Figure 3 is a sectional view of another modified form of my motor mounting;

Figure 4 is a sectional view of another form of motor mounting;

Figure 5 is an elevation view of a fan motor and housing utilizing the motor mounting of Figure 3; and Figure 6 is a graph of noise transmissibility versus mounting flexibility.

It is well known that in order to obtain good vibration isolation the natural frequency of a mass in vibration on its elastic support must be considerably less than the impressed frequency which it is desired to isolate. The equation for noise transmissibility is:

$$e = \frac{1}{(f/f_0)^2 - 1}$$

$f_0$=natural frequency
$f$=impressed frequency

If the natural frequency cannot be made less than .707×impressed frequency, the elastic support will actually increase the transmitted vibration and do harm instead of good. Since it is usually impractical to make an elastic support sufficiently flexible to have it effective in isolating the low frequency vibrations due to mechanical unbalance the problem normally resolves itself into that of providing sufficient flexibility to satisfactorily isolate the high frequency (120 cycles and higher for 60 cycle current) magnetic vibrations while providing sufficient stiffness not to appreciably magnify the low frequency mechanical vibrations. By way of example, suppose an 800 r.p.m., 60 cycle motor is to be elastically mounted. The electrical vibration (rotary about shaft axis) has a frequency of 120 cycles and the mechanical vibration has a frequency of 13.3 cycles perpendicular to the shaft. The problem is to produce a mounting which, acting with the motor mass, will have a natural rotational frequency of preferably less than 20 cycles while having a translational and a perpendicular to shaft rotational natural frequency of more than 26.6 cycles.

Figure 1:
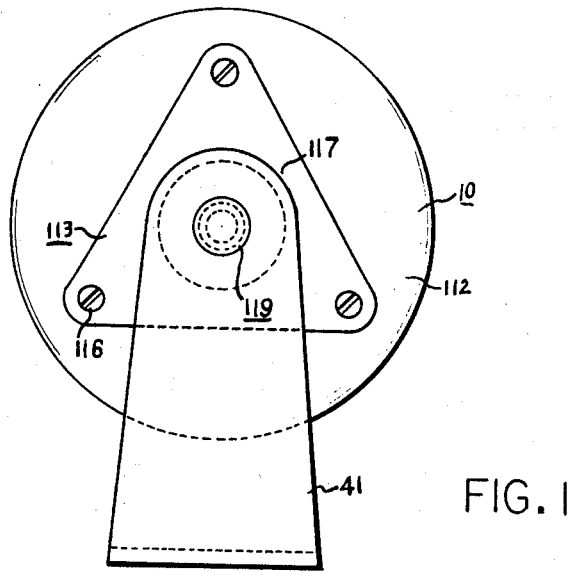
Figure 1 is an end view of a motor illustrating my motor mounting.
Figure 2:
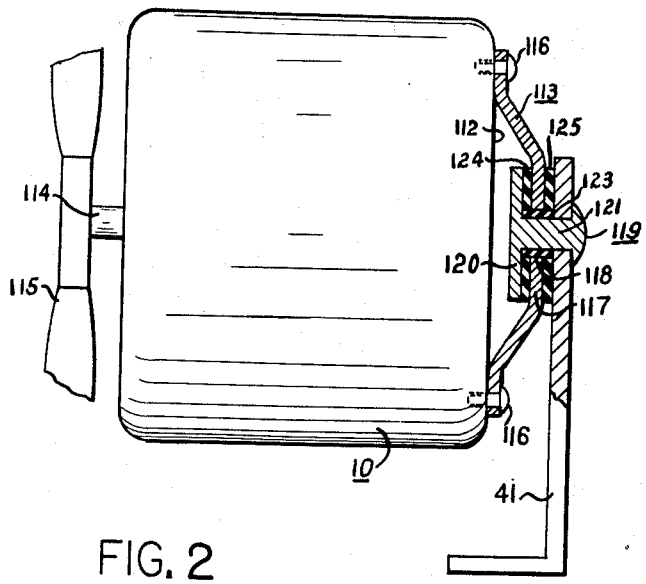
Figure 2 is a side view of a motor with my motor mounting of Figure 1 in cross section to better illustrate the construction thereof.

In Figures 1 and 2 of my drawings, I illustrate a motor, such as the fan motor 10, elastically mounted on a support bracket 41 to provide good vibration isolation without permitting the motor to droop. The fan motor 10 is mounted with its armature extending substantially perpendicular to the support bracket 41. The motor mounting 12 supportingly fastens the fan motor to the support plate 11.

The motor 10 is described as having a housing end 112 extending in a plane substantially perpendicular to the armature shaft 114 which in this particular instance supports a fan blade 115.

I have mounted a support plate 113 on the end 112 of the motor by means of small bolts 116 and have preferably constructed the plate 113 of a triangular shape as is illustrated in Figure 1. It is understood, however, that the plate 113 may be fastened to the end 112 of the motor 10 by any suitable means, such as welding. The support plate 113 has also been constructed somewhat dish-shaped to provide space between the center portion 117 thereof and the housing end 112 of the motor. This center portion 117 has an opening 118 therethrough.

A fastening member, such as rivet 119, having an enlarged head 120 extends through the opening 118 in the center portion of the support plate 113 and engages the support bracket 41 to hold the motor 10 onto the support bracket 41. The enlarged head 120 of the rivet or fastening member is disposed between the center portion 117 of the support plate 113 and the end 112 of the motor 10. Thus, the support plate 113 is disposed between the enlarged head 120 and the support bracket 41. The rivet 119 may be considered as having a hub portion 121, which is that portion of the rivet extending through the opening 118 and engaging the support bracket 41. In actual practice, the hub 121 or shank of the rivet is beaded over as is illustrated in Figure 2 to securely fasten the rivet to the support bracket 41.

In this embodiment of my invention, I have mounted a resilient sleeve 123 on the hub 121 of the rivet or fastening member 119. A resilient washer 124 is placed between the support plate 113 and the enlarged head 120 of the rivet and a resilient washer 125 is placed between the support plate 113 and the support bracket 41. These resilient washers and the resilient sleeve 123 resiliently space the support plate 113 from the fastening member or rivet 119 and the support bracket 41.

In this construction of my motor mounting, the hub 121 of the rivet or fastening member 119 and the enlarged head 120 form a hub with a flanged end. The hub is carried by the support bracket 41 with the flanged end disposed furthest from the support bracket 41, thus forming a space about the hub and between the flanged end 120 and the support bracket 41. The motor support plate 113 extends into this space and engages the resilient sleeve 123 which surrounds the hub 121. I have found that the translational movement of the motor in a direction perpendicular to the shaft 114 may be at least partially controlled by inserting the resilient sleeve 123 between the hub or fastening member and the support plate 113. This sleeve is in compression as a result of such translational movement and the forces produced by this compression resist the movement. At the same time, the resilient washers 124 and 125, which are disposed between the enlarged head 120 and the support plate 113, and also between the support plate 113 and the support bracket 41, further isolate the motor from the support bracket 41 and at the same time permit slight rotational freedom of the motor relative to the support bracket. Thus, resilient washers 124 and 125 also prevent translational or drooping movement of the motor.

When the motor mounting is constructed in the manner shown in Figures 1–3 and 5, a plurality of non-resilient and resilient laminations are formed. The non-resilient laminations include the support bracket 41, support plate 113, end bell 53, mounting plate 54, and the enlarged heads 61 and 120. The resilient laminations include the resilient washers 23, 24, 124 and 125. The resilient washers or laminations will prevent translational movement and droop of the motor even though the resilient sleeve 18 or 123 is omitted. In this instance, I have found it preferable to cement the resilient washers to the support bracket and the support plate. Any suitable bonding cement or method of bonding resilient materials to other material, which will secure the resilient washers to the respective support members, may be used. Where the resilient sleeves 18 or 123 are utilized, they also may be bonded or cemented to the surfaces they touch, to thus aid in taking stress in rotational shear. This sandwiching of the laminations together provides a motor mounting which resiliently supports the motor housing on the support bracket. This motor mounting which I have thus described may be used on many small motors and the motor may be suspended horizontally or vertically.

In assembling the motor mounting of Figures 1 and 2, the sleeve 123 and the washer 124 are placed on the rivet 119. The rivet and the sleeve are then inserted through the opening 118 in the support plate 113. The resilient washer 125 is next positioned over the resilient sleeve 123 and against the support plate 113. Next the hub 121 or shank of the rivet 119 is inserted in a rivet hole in the support bracket 41 and the end thereof beaded over to tightly and resiliently fasten the support plate 113 to the bracket 41, preferably with prestressing in compression opposing contact areas on the resilient washers. It is understood that a large flat headed bolt may be threaded into the opening in the support bracket 41 as a substitute for the rivet 119. However, I have found the rivet 119 to be the most practical fastening member for this purpose. The support plate 113 is then bolted to the motor 10 by means of bolts 116 to complete the construction of this improved motor mounting.

The Figure 3 shows another elastic mounting for a motor which is essentially the reverse of the mounting of Figures 1 and 2. In Figure 3 a motor 50 is shown as supported by an elastic mounting 51. This motor and elastic mounting is also shown in Figure 5 with the mounting 51 being supported by a fan housing 52. This fan housing is adapted for use as a window fan with the housing being made of sheet aluminum or other suitable material and is approximately twenty-seven inches square and four and one-half inches thick, which is greater than the thickness or length along the axis of the motor 50, which is only about three and three-fourths inches.

The motor 50 includes an end bell 53, and the mounting 51 abuts this end bell 53 and includes a steel washer 54 which is carried by spokes 55 from the housing 52. There may be more spokes 55 or other rods or wires than those shown in order to provide a protective grill for the fan blades 56. The inner ends of the spokes 55 are welded at 57 to the steel washer 54. This is illustrative of one satisfactory form of fastening the spokes 55 to the steel washer 54 and of supporting this washer 54.

The motor 50 has a stationary shaft or axially projecting hub 60 which is along the axis of the armature of the motor 50. A washer 61 and screw 62 form a large head for the stationary shaft 60. The resilient washers 23, 24, and resilient sleeve 18 form the elastic portion of the elastic mounting 51. The elastic washer 23 is positioned between the end bell 53 and the steel washer or support plate 54, and the elastic washer is positioned between the other face of plate 54 and the metal washer 61. The resilient sleeve 18 radially spaces the hub 60 from the support plate 54. The motor 50 has an outside diameter of approximately six inches with a length of about three and three-fourths inches as previously stated. The resilient washers 23 and 24 have an outside diameter of about 1.75 inches and an inside diameter of about .875 inch. Preferably, the axial length of the stationary shaft 60 which protrudes past the end bell 53 is made sufficiently shorter than the combined thickness of the resilient washers 23 and 24 and the steel washer 54 opposing contact areas of the washers 23 and 24 are pre-stressed in compression to a point where the upper half of the washer 23 and the lower half of the washer 24 still remain in compression despite the overhanging load of the motor 50.

This mounting of Figures 1-3, and 5 has been found to be quite satisfactory to do the two jobs of providing sufficient rotary elasticity to isolate from the support the impressed frequency, which is often termed the single phase torque vibration, and yet to have sufficient stiffness along the axis to prevent any appreciable droop caused by the cantiliver load or any other movement perpendicular to the axis of the motor 50. It will be noted that stiffness along the axis which provides resistance to the droop moment is required in the fan housing of Figure 5 since the tips 63 of the blades 56 come very close to the inner periphery 64 of the housing 52. Thus, the elastic mounting 51 to be satisfactory must be sufficiently stiff along the axis to prevent the tips of the blades from striking the housing or the spokes 55 no matter how the housing 52 is positioned in use, and also to withstand shocks in shipment, and further to resist any appreciable increase in droop due to aging of the rubber.

The Figure 4 shows another form of elastic mounting 68 which, as will be shown hereinafter, has approximately the same rotary elasticity as the elastic mounting 51 of Figures 3 and 5. This elastic mounting 68 is again used with the motor 50, the spokes 55, and in conjunction with larger diameter steel washers 154 and 161. The shaft 160 is similar to the shaft 60 of Figure 3 but has been lengthened to accommodate the longer resilient sleeve 69 and thicker washers 70 and 71.

The graph 74 of Figure 6 is a graph of noise transmissibility $e$ plotted against increasing flexibility of the elastic mounting. The graph 74 shows a solid line curve 75 and a dotted line curve 76. Both curves start at unity on the ordinate and curve 75 goes to infinity at unity on the abscissa. The abscissa, which is increasing flexibility, is a numeric expressed as the ratio of the impressed frequency $f$ divided by the natural frequency of vibrations $f_0$ of the mass $m$ of the stator of the motor on an elastic mounting having a spring constant K. The curve 75 is a curve of noise transmissibility $$e = \frac{1}{\left(\frac{f}{f_0}\right)^2 - 1}$$

It shows a noise transmissibility for the case of the vibrating motor being attached to a rigid foundation through the elastic mounting. This might be similar to the case of an electric motor elastically mounted in rotary shear to a concrete floor which has a relatively large mass. In such case, the curve 75 shows the ratio of the vibration amplitude produced in the foundation of large mass when using the elastic suspension to that produced with a rigid connection between the motor and the foundation.

The curve 76 shows more nearly the actual conditions since this is plotted with a case where the inertia of the support is 10 percent of the motor inertia.

The above-described elastic mountings of Figures 1-3 and 5 provide rubber or other resilient washers which are relatively small in outside diameter compared with the outside diameter of the electric motor. This is far more important than one would ordinarily believe. A common form of elastic mounting for a fractional horsepower motor is to use a U-shaped mounting frame which straddles the motor, and the ends of the U-shaped bracket carry rubber rings in which the two opposite motor hubs of the motor end bells are mounted. The predominant magnetically produced vibration of a single phase electric motor is a rotary vibration at twice line frequency about the axis of the motor. Thus, this rotary vibration produces predominantly shear stress in the rubber mounting. The sideways (to the shaft) force due to motor unbalance or due to motor weight or belt pull is taken by compressive forces in the rubber rings, it being well known that rubber is more flexible in shear than in compression.

In the present case of a single elastic mounting, as opposed to a conventional elastic mounting attached to each of the two ends of the motor, the elastic mounting is subjected not only to shear caused by rotary vibration and to compression in sleeve 18 or 123 caused by the motor weight, but when the motor axis is horizontal it is also subject to a moment due to the overhung motor weight. This moment tends to increase the rubber compression in the bottom of rubber washer 23 or 125 and to reduce the compression in the rubber in the top half of the same washer. By this use of rubber, the desired rotary freedom of the motor is permitted by the rubber in shear whereas the undesired vibration or movement due to unbalanced weight or belt pull is restrained by rubber in compression. Under the influence of this moment, the rubber washer tends to become thinner at the bottom and thicker on top with the result that the motor tends to droop in its mounting. The problem is to make the washers sufficiently flexible in shear to do a good job of isolating the double frequency torque vibration while at the same time being sufficiently stiff to the moment to prevent an undesirable amount of droop. If the electric motor is not properly resiliently mounted, this vibration is transmitted to the motor support which generally acts as a large sounding board, thus producing large amounts of annoying noise. This is referred to in my article in Electrical Manufacturing, May 1938, page 76. It is also referred to in "Vibration Prevention in Engineering" by Arthur A. Kimball, 1932, at page 96. These two references show graphs of noise transmissibility versus flexibility of the elastic mounting. This graph is the basis for Figure 6 of the present drawings. Kimball states that for good sound isolation, one should have a spring suspension which is sufficiently flexible that the ratio of impressed frequency to the resonant frequency of the motor stator is about six or seven to one. This reduces the noise transmitted to one in 35 or one in 48.

The problem thus becomes to obtain this elastic mounting which is sufficiently flexible to shear yet sufficiently rigid to prevent droop in the present case of a single elastic mounting for a cantiliver support of a motor.

The rotary vibration of fractional horsepower motors, which generally are single phase motors, is frequently called the single phase torque vibration. For sixty-cycle alternating current power, this will be one hundred twenty cycles per second, since the flux has one hundred twenty reversals per second. The Figure 5 shows a large window fan to which this elastic mounting has been applied, and in such case one desires a determination of the point of operation of this motor and mounting on the graph 74 of Figure 6.

If the rubber washers in the elastic mounting are made large relative to the diameter of the motor, which is a natural design tendency to limit the droop of the motor, it will then be shown that the rotary elasticity of the mounting is far from adequate. My article in Electrical Manufacturing, supra, shows on page 80 an electric motor designed for vertical axis mounting and it was designed for a garbage disposal unit for home use. In that motor mounting there were two rubber washers sandwiched between metal mounting plates so that the rubber washers were subjected to rotary shear. However, they did not withstand any bending moment, since there was no sideways belt pull nor was there any cantilever loading since the loading was designed for a vertical axis condition. Also in that case, the mounting was designed for good axial stiffness, and to obtain close tolerance of shaft concentricity relative to the mounting holes, at the expense of best possible noise isolation. For confirmation, that article mentioned that the noise isolation was not as good as in the case of the double ended shear mounting. Still further, I have now discovered that the diameter of the rubber rings of mounting was much too large, as will hereinafter be evident.

The first consideration is the determination of the natural frequency of vibration $f_0$, in order to determine the point of operation on the graph of Figure 6 for the mounting of Figure 3. The natural frequency of a rotary oscillating system is determined by:

$$\omega_0 = \sqrt{\frac{K}{I}} \quad (1)$$

where $$\omega_0 = 2\pi f_0 \quad (2)$$

K is the spring constant in pound feet per radian, and I is the moment of inertia of the motor stator in poundal feet squared.

The moment of inertia of the stator portion of the motor is that which is of interest. It is the stator which has a rotary vibration, namely, the single phase torque vibration. Its vibration is passed by the elastic mounting to the support for the entire motor in accordance with the stiffness of that mounting. Since the motor stator is not a regular geometrical figure, the calculation of the moment of inertia is extremely difficult. Therefore, a right cylindrical mass was used as a standard to calibrate a torsion pendulum by determining the period of vibration of this standard. The motor stator was then placed in the same torsion pendulum, its period determined, and from this and the calculated moment of inertia of the standard cylindrical mass, there was determined the moment of inertia of the motor stator. It was determined to be:

$$I = .01155 \text{ poundal feet}^2 \quad (3)$$

The present state of the art of the rubber usable in elastic mountings is such that the rubber of a hardness of durometer 50 has been used in order to obtain satisfactory life of the rubber. Still softer rubber, namely, durometer 30 hardness, may be used; however, this is not considered to have satisfactory life and the rubber companies prefer to recommend a minimum hardness of 40 durometer in order to get adequate life in something like an electrical appliance which should last for several years. The data obtainable from one of the large rubber companies on a particular type of natural rubber of durometer 50 hardness is that it has an initial shear modulus of elasticity $$G = 50 \text{ pounds per square inch} \quad (4)$$

Similar information on a very good grade of neoprene of 50 durometer is that it will have an initial shear modulus G of 85 pounds per square inch. These values are static values and must be increased somewhat to obtain the value required for dynamic loading of the rubber at 120 cycles per second, and must be increased further to allow for aging, which is expected to take place during a year or so of actual operation. For calculation purpose, it is estimated that these figures of G should be increased to 70 and 125 pounds per square inch for the best compounded natural rubber and neoprene, respectively.

The rotary elasticity of the entire mount depends upon the shear modulus of elasticity of the rubber as well as the physical shape of the elastic mounting. The spring constant K is generally inversely proportional to the elasticity, and thus:

$$K = \frac{T}{\theta}$$

where T is torque causing rotary movement, and $\theta$ is the angle of movement in radians. This is true, because the stiffer the spring, the smaller will be the angle of movement for a given torque. The mounting of Figures 1 and 3 are generally the same and have two rubber washers. Specifically, for the elastic mount of Figure 3, the outside diameter is $$D = 1.73''$$

and the inside diameter is $$d = .875''$$

The thickness is $$t = .12''$$

The formula for the resisting torque T of a rubber washer in rotational shear is $$T = \frac{\pi}{2} \frac{G\theta}{t} \frac{(D^4 - d^4)}{16} \quad (5)$$

where $\theta$ is the angle in radians.

$$T = 1.57 \frac{G\theta}{t} \frac{(D^4 - d^4)}{16} \quad (6)$$

Substituting, with G=70 for natural rubber, one obtains $$T = 1.57 \times \frac{70}{.12} \left(\frac{8.335}{16}\right) \theta \quad (7)$$

Therefore, since the spring constant K for one washer is $$K = \frac{T}{\theta} \quad (8)$$

expressed in pound feet per radian, $$K = 476\frac{1}{12} = 39.7 \text{ pound feet per radian} \quad (9)$$

Now since the elastic mount of Figures 1, 3, and 5 contains two washers, a total spring constant of the elastic mount is $$K = 79.4 \text{ pound feet per radian} \quad (10)$$

If one were to use synthetic rubber, this would increase the spring constant K by the ratio of 125/70, or a value of 142.2 pound feet per radian.

The natural frequency of vibration $f_0$ is then determined from Equation 1, and is $$f_0 = \frac{1}{2\pi} \sqrt{\frac{K}{I}} \quad (11)$$

$$f_0 = \frac{1}{2\pi} \sqrt{\frac{79.4}{.01155}} = \frac{1}{2\pi} \sqrt{6870}$$

$$f_0 = \frac{1}{2\pi} \times 82.8 = 13.18 \quad (12)$$

for natural rubber of shear modulus of 70. For synthetic rubber, with shear modulus of 125, the value of the natural frequency of vibration would be 125/70 times 13.18, or 17.6 cycles per second. Therefore the ratio $$f/f_0 \text{ is 9.1 for natural rubber, or} \quad (13)$$

$$f/f_0 = 6.82 \text{ for synthetic rubber} \quad (14)$$

This is a satisfactory point of operation on either curve of Figure 6. Thus, the noise transmissibility is 1.22 percent for natural rubber or 2.19 percent for synthetic rubber.

The graph of Figure 6 shows the noise transmissibility e versus flexibility. The abscissa is expressed as a ratio of impressed frequency to the free vibration frequency of the mass of the stator on the elastic mount. The noise transmissibility e is defined as the ratio of the vibration amplitude produced in the support when using the elastic suspension to that produced with a rigid connection. The easiest case to analyze mathematically is when the foundation or housing has a relatively infinite mass. This is shown by the curve 75 in the graph 74 of Figure 6. This might typify the case where an electric motor is elastically mounted on a concrete floor.

In the case of the fan motor shown in Figure 5, the complete motor weighs about 14 pounds, whereas the housing from which it is supported elastically weighs only about 8 or 9 pounds since it is made principally of sheet aluminum. The graph 74 shows a curve 76 in dotted lines which is a noise transmissibility curve when the moment of inertia of the housing is only 10 percent of the motor stator moment of inertia. This curve 76 shows that as the foundation or support becomes lighter relative to the mass of the motor, the problem of noise transmissibility increases. In the present case of a housing weighing in the order of 60 to 70 percent as much as the motor stator, the noise transmissibility curve will lie somewhere between the curves 75 and 76.

It will be noted, that if the impressed frequency $f$ equals the free vibration frequency $f_0$, then this is a resonant condition with tremendously increased noise transmissibility. This is indicated by curve 75 since $f=f_0$ the noise transmissibility $e$ goes to infinity. From the Formulas 5 and 8 relating to torque and spring constant K, it will be seen that if the rubber mounting is too large in diameter, it will be quite stiff, since the stiffness increases as $D^4$, and thus the free vibration frequency $f_0$ may be relatively high. If the free vibration frequency $f_0$ exceeds .707 of the impressed frequency $f$, then the noise transmissibility $e$ will be actually worse than the case where a direct metal-to-metal connection is used from motor to support. As shown on curve 76, the elastic mounting must be even more elastic in the actual case of a housing not having very large mass. Thus, one strives to obtain an elastic mounting which is as flexible as possible in rotary shear, consistent with sufficient rigidity in other directions and the permissible stresses in the rubber.

It is thus seen from Equations 13 and 14 that the elastic mounting using the present rubber washers of 1.73 inches outside diameter, when used with an electric motor having an outside diameter of 6⅛ inches, is sufficiently flexible. With these dimensions, the outside diameter of the rubber washer is 28.8 percent of the outside diameter of the motor.

The spring constant K obviously increases as the diameter of the washer increases. The moment of inertia of a cylinder about its axis is $mr^2$, where $m$ is the mass and $\bar{r}$ is the radius of gyration. For constant natural frequency and for constant washer thickness, the spring constant of the washer is proportional to this moment of inertia of the washer and $$K=Q\frac{(D^4-d^4)}{t} \quad (15)$$

where Q is a constant. In the actual case of my rubber washer mounting the inside diameter $d$ is approximately half the outside diameter D. This not essential; it merely happened to be the proportions in this particular mounting. In the general sense, let $d=aD$ where $a$ is a constant. This means that the inside and outside diameter bear a constant ratio. The spring constant of the washer thus becomes $$K=Q\frac{D^4(1-a^4)}{t} \quad (16)$$

Let us now investigate what would happen should one desire to make the outside diameter D "$b$" times as large yet to maintain the same spring constant. From the above formula, it will be obvious that to maintain the same K with the diameter now changed to D$b$, one must make $tb^4$ times as thick. The formula thus becomes $$K=\frac{QD^4b^4(1-a^4)}{b^4t} \quad (17)$$

Now if $b=2$, namely, the outside diameter has become twice as big, we find that it has changed from 1.73 inches to 3.46 inches. Also, the thickness which originally was ⅛ of an inch has now become $b^4$ times as thick, or 16 times as thick, or 2 inches. Also, if the diameter is doubled, the area is four times, and therefore the volume is 64 times as great. This grotesque mounting is that shown in Figure 4. This mounting of Figure 4 would have the same flexibility in rotary shear as the compact mounting of Figure 3. It is obvious that the diameter of the rubber washers cannot approach 60 percent of the outside diameter of the electric motor without becoming unduly thick.

The value of $$\frac{K}{I}$$

is important, since the square root of this quantity equals $\omega_0$. From Equations 5, 8 and 11, it will be noted that if the diameter D is doubled, K increases by 16 times, yet I remains the same, hence $\omega_0$ increases by 4 times, or $b^2$. With $$\frac{K}{I}$$

equaling 6870, and this giving a ratio of $f/f_0$ of either 9.1 or 6.82 for natural or synthetic rubber, it will be seen that $$\frac{K}{I}$$

may increase to about 30,000 before one reduces the ratio $f/f_0$ to a low limit value of 4.3 for natural rubber.

If one now keeps the thickness of the washers at .12 inch, and increases the diameter from the value of 28.8 percent of the motor outside diameter to the value of 40 percent of the motor outside diameter, then the ratio of $f/f_0$ decreases by the ratio of $(28.8/40)^2$. Thus, $f/f_0$ for natural rubber changes from 9.1 to a low limit value of about 4.7.

In the mounting of Figure 3 the washers being only ⅛ of an inch thick provide a satisfactorily small angle of droop. A determination of the droop is important. For only a single rubber washer the calculation of the droop is as follows:

$$dF=\frac{2xdy\ y\theta}{t}E \quad (18)$$

Where F is the force, $x$ and $y$ are the abscissa and ordinate of the point defining the locus of a circle in the mathematical formula of a circle which is $r^2=x^2+y^2$, with $r$ being the radius. E is the compression modulus of elasticity, or Young's modulus. This formula holds because the washer is under compression in the lower half of its semi-circular periphery. As $y$ increases, namely, the distance along the ordinate from the neutral axis, the compression of the washer increases. Since the torque T equals force times distance, then $$dT=\frac{2xdy\ y\theta}{t}Ey \quad (19)$$

Since $$x=\sqrt{r^2-y^2} \quad (20)$$

then $$dT=2\sqrt{r^2-y^2}y^2dy\theta\frac{E}{t} \quad (21)$$

One can assume the same torque from the upper half of the rubber washer. This is because the elastic mounting of Figures 1 and 3, for example, will preferably be prestressed in compression so that the bending moment or torque caused by the overhanging load will partly relieve this compression of the upper half of the washer but will not entirely relieve it. Thus, the upper half of the washer contributes to resistance to droop of the motor. Integrating, one obtains $$T=4\int_0^r \theta \frac{E}{t}\sqrt{r^2-y^2}\, y^2 dy \qquad (22)$$

$$T=4\theta\frac{E}{t}\left[-\frac{y}{4}\sqrt{(r^2-y^2)^3}+\frac{r^2}{8}\left(y\sqrt{r^2-y^2}+r^2 \sin^{-1}\frac{y}{r}\right)\right]_0^r$$

$$T=4\theta\frac{E}{t}\left[\frac{r^4}{8}\sin^{-1}\frac{r}{r}\right]$$

$$T=\frac{\pi}{8}\theta\frac{Er^4}{t}, \text{ for one washer} \qquad (23)$$

Thus, the torque equals $$T=\frac{\pi}{4}\theta\frac{E}{t}r^4 \text{ for two washers} \qquad (24)$$

From a handbook on rubber, one obtains $$E=375 \text{ pounds per square inch per inch}$$

for rubber of 50 durometer hardness. Thus, the torque becomes $$T=\frac{\pi}{4}\times\frac{375}{.125}(1.75^4-.875^4)\times\frac{1}{16}\theta \qquad (25)$$

$$T=151(8.92-.585)\times\frac{1}{16}\theta$$
$$T=151(8.335)\theta$$
$$T=1284 \text{ inch pounds per radian} \qquad (26)$$

The motor weight is about 14 pounds and the moment arm is about 2 inches, namely, the horizontal distance from the center of the mounting to the center of mass of the motor. Thus, the torque or moment is equal to 28 inch pounds. Therefore, $$\theta=\frac{28}{1284}\times\frac{180°}{\pi}=1.25° \qquad (27)$$

This is a satisfactorily small angle of droop in the mounting of Figures 3 and 5. This means that the angle of the motor is dropped down 1.25° relative to the horizontal or relative to the axis of the mounting.

It now becomes necessary to determine whether the compressive stress in the rubber caused by the moment of droop exceeds the maximum compressive stress consistent with satisfactory life of the rubber. The moment of inertia of a circle about its diameter is $$I=\frac{\pi r^4}{4} \qquad (28)$$

From handbooks, we determine that $$S=\frac{Mc}{I} \qquad (29)$$

where S is the stress in pounds per square inch, M is the moment causing droop, and c is the distance from the neutral axis to the extreme fibers of the rubber washer which in this case is equal to the radius. The moment of inertia of the washer about its horizontal neutral axis is thus $$I=\frac{\pi r^4}{4}=\frac{\pi}{4}(1.73^4-.875^4)\frac{1}{16} \qquad (30)$$

$$I=\frac{\pi}{4}(8.92-.585)\frac{1}{16}$$

$$I=6.54\times\frac{1}{16}=.408 \text{ inch}^4 \qquad (31)$$

The moment of droop is $$M=14\times 2=28 \text{ inch pounds}, \qquad (32)$$

and $$\frac{c}{I}=\frac{1.73}{.408\times 2}=2.12, \text{ for two washers}$$

Therefore, $$S=28(2.12)=59.4 \text{ pounds per square inch for one washer} \qquad (33)$$

The above calculation assumes that the compressive forces at the bottom of the washer are equal to the tension forces at the top, or vice versa. If the washer is not bonded, no dependable tension forces will be present and it is necessary to prestress the washers in compression by an amount equal to the maximum tension which will exist if a gap is to be avoided. If the rubber is prestressed in compression by this amount, it is obvious that the maximum stress in compression will be doubled. But since two washers are actually used, the above is correct for two prestressed washers acting together.

The stress of about 60 pounds per square inch in the outermost fibers of the rubber is satisfactory, since 250 p.s.i. is a safe limit, and since it is relatively small, the amount of increasing droop with age will be negligible.

The shape of the rubber mounting under compression determines the percentage deflection per inch. Thus, data supplied by the rubber companies is that if a block of rubber 4 inches long, one inch wide, and one inch thick is compressed along its thickness, then the rubber bulges out along the four sides to which no pressure is applied, such that the deflection is 18 percent of the thickness. Now, however, if the length and width are held constant and the thickness is reduced to one tenth of an inch, then the deflection is only 2.7 percent of the thickness.

This comparison of deflections of 18 percent and 2.7 percent of the thickness means that the actual droop is even greater than the percentages. These are for thicknesses of a ratio of 10 to 1. Since the thickness of the rubber in the case of the 18 percent deflection is 10 times as great as the thickness in the case of the 2.7 percent deflection, the actual deflection is 180/2.7, or 66½ times as great. While the nature of the deflection in the case of Figures 3 and 4 is somewhat different, it can still be seen that the proportions shown in Figure 4 will result in much more droop, for example, that shown in dot-dash lines, than would be the case for the much thinner washers of Figure 3. While it is preferable to have the rubber and metal surfaces bonded, so as to prevent movement of the rubber with respect to those surfaces, and to permit the rubber to be put in tension to droop, it has been found that good mountings of this type can be produced without bonding the rubber to the metal. It has been found that even with uncemented surfaces, the rubber tends to adhere to the metal surfaces of its own accord, thus accomplishing much of the same effect as if the surfaces had been bonded together.

A comparison of Figures 3 and 4 illustrates the practical aspects of the above data. In the mounting of Figure 4 with the two-inch thick rubber washers 70 and 71, the droop moment causes the washers to be squeezed out into some such curve as shown by the dot-dash line because of the large distance between the motor end bell 53 and the support plate 154. In contrast, the rubber washers of Figure 3 have no such chance to squeeze out. Being only one-eighth of an inch thick, the peripheral area of the washer is so small that any squeezing out between the end bell 53 and the mounting support plate 54 is negligible in comparison with that shown in Figure 4. Thus, the Figures 3 and 4 graphically illustrate why a large rubber washer mounted for vibration in shear is impractical since one must make it sixteen times as thick for a doubled diameter in order to obtain the same rotary elasticity. Apart from the obvious awkwardness of the structure, it is obvious that with the thick rubber washers of Figure 4, the droop becomes very much greater than in Figure 3.

The droop is still further increased in Figure 4, because with the two-inch thick washer 70, the moment arm from the support plate 154 is now increased from about two inches to four inches, and thus the droop moment is approximately doubled.

Conversely, the rubber washer may be made smaller than that shown in Figure 3. Referring to Formula 17, if $d$ is made one-half, in other words, the outside diameter of the washer is cut in half yet keeping the same proportion of outside diameter to the inside diameter of the rubber washer, one then finds that for the same spring constant K the new thickness becomes .0078 inch. Also, the volume of the rubber washer is one sixty-fourth as much as formerly. This thickness of the rubber washer of only about eight-thousandths of an inch is getting so thin that imperfections or roughness in the surface of the end bell 53 or mounting plate 54 may cut through the rubber or cause localized points of stress which will exceed the maximum allowable compressive stress on the rubber consistent with satisfactory life. It will be noted from the above that as the diameter is reduced to one-half, the thickness is reduced to one-sixteenth. This extreme thinness of the rubber washer makes the motor still more resistant to droop than formerly and thus is an improvement from that standpoint, yet the limits of maximum stress of compressibility of the rubber will limit the amount one can go in this direction. Using the Formulas 29 and 30 above, the maximum compressive stress of such a washer of $D=.875$ becomes eight times as great, because the moment of inertia of the washer about its axis is now only one-sixteenth and $c$ is now one-half their former values. The stress in the outermost fibers of the washers thus exceeds the maximum allowable, unless a better quality of rubber is used, or the rubber washers are bonded to essentially cut in half the maximum stresses therein. With this rubber washer of outside diameter of .875 inch the ratio of washer outside diameter to motor outside diameter is approximately 15 percent. Thus, keeping within reasonable limits the thickness and outside diameter of the rubber washer, it would appear, with electric motors of average proportions of diameter to length, that the outside diameter of the rubber washer should be about 15 to 40 percent of the outside diameter of the electric motor.

It is presumed in the discussion above that the motor is constructed in such fashion as to make the center of gravity of the stator lie on the axis of the shaft, in other words, that the motor is symmetrical about the shaft. In case the stator structure is unsymmetrical, or has fastened to it an unsymmetrically mounted mass, the axis of the rubber mounting shall preferably be made to pass through the center of gravity, otherwise compressive forces will be set up in the rubber sleeve 18, and the rubber washers will have a higher moment of inertia.

From the above it can be seen that it is most economical in rubber to make $b$ and consequently D as small as possible. There is another reason why D should be small. As D is made smaller by the multiplier $b$, the thickness $t$ is made smaller by the multiplier $b^4$. In other words, the thickness becomes smaller very much faster than the diameter and as the ratio of thickness to diameter is reduced the amount of droop is also reduced and the less the droop the better.

The limit to which the outside diameter of the washers may be reduced and the thickness of the washer also reduced to maintain constant K is probably determined by two things. As the size of the washer is reduced, the mechanical stresses in the washer are increased until the maximum permissible average mechanical stresses are reached. A further reduction in diameter would cause too short a life for the mounting. Also, as the diameter is reduced the rubber thickness is very much reduced and a point is reached where it is not practical to make the washers still thinner or slight mechanical irregularities would cause very high local stresses and failure or would cause a bend tending to constrain the motion which the washers are intended to permit and thus defeat the purpose of the mounting. The above shows that so far as effectiveness of the rubber washer mounting is concerned the outside diameter of the washers bears a fairly constant relation to the outside diameter of the motor and should be preferably less than 40 percent of the outside diameter of the motor. The minimum diameter is also fairly constant in relation to the diameter of the motor in so far as average loading of the rubber is concerned and should be preferably greater than 15 percent of the outside diameter of the motor. The liimtation as regards the localized stresses caused by irregularities is, of course, dependent on the accuracy to which the parts are made and must be determined after consideration of the accuracies actually obtained.

To show that the maximum permissible diameter of the washer is related to the outside diameter of the motor, consider that it has been explained before that for a motor stator of a certain moment of inertia I around its axis the spring constant K of the mounting must not exceed a certain value which is proportional to the stator moment of inertia. For a motor having a frame length $L_s$ proportional to its diameter $D_s$, its moment of inertia $I_s$ varies approximately as the fifth power of the outside diameter.

$$I_s = \text{constant} \times D_s^4 \times L \qquad (34)$$

and if $L_s = CD_s$, where C is a constant, $$I_s = \text{constant} \times D_s^5 \qquad (35)$$

For a constant thickness of rubber washer the spring constant K varies approximately as the fourth power of the outside diameter of the washer, therefore, $$K = \text{constant} \times D^4 \qquad (36)$$

Since the maximum permissible spring constant of the rubber is related to the stator moment of inertia:

$$K_{\text{max.}} = \text{constant} \times I_s \qquad (37)$$

then the maximum permissible diameter of the rubber washers bears an approximately constant relationship to the outside diameter of the stator, namely $$D_{\text{max. washer}} = \text{constant } D_s^{5/4} \qquad (38)$$

This means that the maximum permissible outside diameter of the washer is approximately proportional to the outside diameter of the stator.

If the motor length is increased proportionally to its diameter, as the motor is made larger its weight will vary as the third power of the diameter, and the lever arm of this weight will vary as the first power of the motor diameter making the torque tending to cause droop vary as the fourth power of the diameter.

$$M_{\text{droop}} = \text{constant} \times D_s^4$$

Since the section modulus Z of the rubber washers about a diameter of the washers, which is a measure of the maximum stress in the rubber of the washers, varies as the third power of the outside diameter of the washers:

$$Z = \frac{I}{D/2} = \frac{(\pi/4)D^4}{D} = C_1 D^3 \qquad (39)$$

where $C_1$ is a constant, and for constant stress in the washers the section modulus must be proportional to the moment causing droop.

$$\text{Section modulus } Z = \text{constant} \times M_{\text{droop}} \qquad (40)$$

and from Equations 39 and 40, $$C_1 D^3_{\text{min. washer}} = \text{constant} \times D_s^4 \qquad (41)$$

$$D_{\text{min. washer}} = \text{constant} \times D_s^{4/3} \qquad (42)$$

The above equation means that the minimum permissible diameter of the rubber washers is closely proportional to the outside diameter of the stator of the motor.

Actually it should be of interest to note that as the motor is made large this analysis indicates that both the maximum permissible outside diameter of the rubber washers and the minimum permissible diameter of the washers will increase slightly in relation to the outside diameter of the stator.

From Equations 25 and 27, one sees that the droop is very small. This is due not only because the elastic washer is thin relative to its diameter, but because the stiffness of rubber, or its spring constant, is much greater in compression than in shear. Thus, any mechanical unbalance of the motor rotor, which causes vibration perpendicular to the shaft, is satisfactorily resisted by the elastic mounting, since the elastic washers are in compression to this vibration. As stated at the beginning of the specification, the unbalanced mechanical vibration is 13.3 cycles per second perpendicular to the shaft for an eight hundred r.p.m. motor. The present mounting is sufficiently stiff in the axial direction; as evidenced by Equation 25 to establish a translational and perpendicular to the shaft natural frequency of vibration of more than twice this impressed frequency, namely more than 26.6 cycles per second. With smaller diameter washers becoming thinner more rapidly than the diameter is decreased, for the same rotational spring constant, then the compressional spring constant is even more increased.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A motor and elastic mounting therefor, said motor having an axis and a given outside diameter and having an impressed frequency of torque vibration about the axis of said motor, said mounting comprising, first, second and third substantially rigid mounting members positioned in that order, a surface in said second member defining an aperture, elastic means including first and second elastic washer portions with said first washer portion positioned between said first and second members and said second washer portion positioned between said second and third members, fastening means passing through said aperture and said first and second washer portions and fastening together said first and third members, said members and said elastic washer portions having opposing contact areas and said fastening means exerting a compressive stress through aid opposing contact areas on said elastic washer portions, means to radially space said fastening means from said second mounting member, one of said first and second mounting members being connected to said motor at only a single axial end thereof substantially coaxial with said motor, the other of said first and second mounting members being connected to a support to constitute the sole support of said motor at one axial end thereof through said elastic washer portions, said washer portions having an axial thickness dimension which is small relative to the dimension perpendicular to said axis, and said opposing contact areas of said members and said washer portions having a dimension perpendicular to said axis no greater than 40% of the outside diameter of said motor.

2. A motor and an elastic mounting therefor, said motor having an axis and a given outside diameter and having an impressed frequency of torque vibration about the axis of said motor, first and second substantially annular resilient washer portions and a radial spacer portion, said annular washer portions and said radial spacer portion defining generally an H-shaped cross section, a mounting plate with an aperture therein, fastening means passing through said aperture to fasten said two washer portions on each side of said mounting plate with said radial spacer portion isolating said fastening means radially from said mounting plate, an enlarged head on said fastening means acting against a face of one of said washer portions, said enlarged head, said resilient washer portions and mounting plate having opposing contact areas and said fastening means exerting a compressive stress through said opposing contact areas on said resilient washer portions, one of said mounting means and said fastening means being connected to a support and the other being connected to said motor and resiliently supporting said motor wtih the axis of said elastic mounting and said motor axis substantially coincident, said mounting being at only a sngie axial end of said motor to constitute the sole support of said motor, said washer portions on said elastic mounting having a substantially uniform thickness which is a small dimension in an axial directon relative to the axially perpendicular dimension of said washer portions, said fastening means subjecting the substantially annular surface area of said two washer portions to a rotational shear stress from said impressed frequency torque vibration, and said opposing contact areas having a dimension perpendicular to said axis in the range of 15% to 40% of the outside diameter of said motor.

References Cited in the file of this patent

UNITED STATES PATENTS

| | | |
|---|---|---|
| 2,004,532 | Mapes | June 11, 1935 |
| 2,044,385 | Geyer | June 16, 1936 |
| 2,188,807 | Gastricone | Jan. 30, 1940 |
| 2,215,666 | Meitzler | Sept. 24, 1940 |
| 2,253,597 | Wyne | Aug. 26, 1941 |
| 2,268,454 | Kucher | Dec. 30, 1941 |
| 2,565,785 | Soldan | Aug. 28, 1951 |